Oct. 31, 1967 R. P. CARTER ET AL 3,350,578
CIRCUIT FOR DERIVING SQUARE WAVEFORM FROM INCOMING ALTERNATING SIGNAL
Filed March 31, 1965
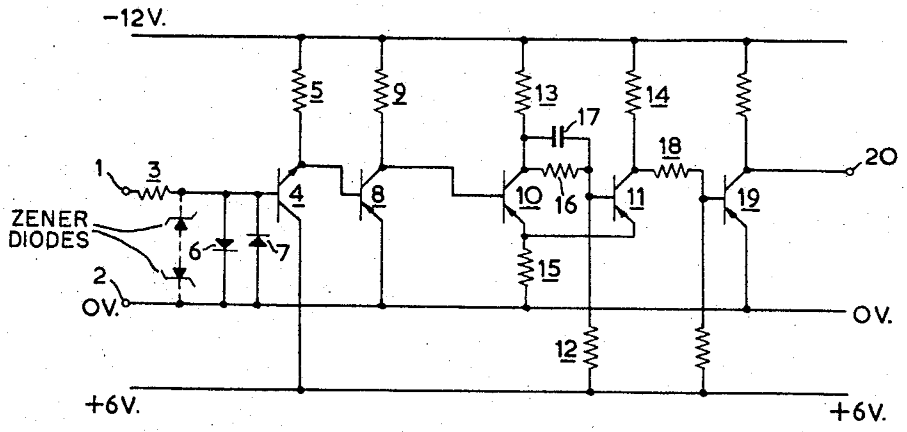
TRANSISTORS 4 & 8 MADE FROM SAME ELEMENT 3,350,578

CIRCUIT FOR DERIVING SQUARE WAVEFORM FROM INCOMING ALTERNATING SIGNAL

Ronald Philip Carter, Bristol, William Alan Cowin, Stafford, and Martin Clifford Hall, Kidsgrove, Stoke-on-Trent, England, assignors to The English Electric Company Limited, London, England, a British company Filed Mar. 31, 1965, Ser. No. 444,133
Claims priority, application Great Britain, June 20, 1961, 22,234/61
2 Claims. (Cl. 307—88.5)

ABSTRACT OF THE DISCLOSURE

This invention relates to a circuit for deriving a square waveform from an incoming alternating signal, the mark-space ratio of the waveform being identical to that of the alternating signal. In particular, the input signal is initially limited and applied to a pair of transistors connected in the emitter-follower mode, one transistor being of opposite conductivity type to the other and the arrangement being such that the inherent voltage drop across the base-emitter junction of the one transistor offsets and balances this voltage drop associated with the other transistor. A Schmitt trigger is connected in an output stage to finally shape the waveform.

This application is a continuation-in-part of our copending application Ser. No. 203,176, filed June 18, 1962, and now Patent No. 3,225,256.

The invention consists in a switching circuit comprising input means for receiving an alternating input signal and limiting the positive- and negative-going excursions thereof, a first transisor of one conductivity type having emitter-base and collector-base junctions and electrically energised in an emitter-follower configuration, said transistor being connected to receive said limited input signal and possessing a predetermined voltage drop across its emitter-base junction, a second transistor of the opposite conductivity type to, but constructed from the same element as, said first transistor, and connected in the common emitter configuration, said second transistor being connected to said first transistor and possessing a voltage drop across its emitter-base junction equal to that across said emitter-base junction of the first transistor whereby to switch between a conducting state and a nonconducting state in response to the positive- and negative-going excursions of said limited input signal applied to the first transistor, and a trigger circuit connected to receive the output from said second transistor and operative to develop a square wave output signal in dependence on the said state assumed by said second transistor.

If the first and second transistors are made from the element germanium, then the input means may comprise a resistor in series with the base of the first transistor and a pair of silicon diodes connected in parallel with their opposite poles connected together, the pair of diodes being connected between the base of the first transistor and the emitter of the second transistor and the input signal being applied to the base of the first transistor through the said resistor.

A transistor switching circuit incorporating the invention for producing a square wave from an incoming substantially sinusoidal alternating current signal will now be described by way of example and with reference to the accompanying drawing which shows a circuit diagram of the circuit.

The alternating current signal is applied between the terminals 1 and 2, terminal 1 being connected through resistor 3 to the base of a transistor 4 which is connected in the emitter-follower configuration between a −12 v. line and a +6 v. line, a resistor 5 being connected in its emitter circuit. Two oppositely poled diodes 6 and 7 are connected between the base of transistor 4 and the terminal 2. The emitter of transistor 4 is connected to the base of a transistor 8, the latter transistor being of opposite conductivity type to transistor 4 and connected in the common-emitter configuration between the −12 v. line and a 0 v. line through a load resistor 9. Transistors 4 and 8 are both made from germanium. The output from transistor 8 is connected to the base of a transistor 10 which, together with a transistor 11, resistors 12, 13, 14, 15, and 16 and capacitor 17 forms a Schmitt trigger circuit of known type. The output of transistor 11 is connected through a resistor 18 to the base of a transistor 19. The output of the circuit is taken from terminal 20.

The operation of the circuit will now be described. The incoming alternating signal from which the circuit is to produce a square wave is applied between the terminals 1 and 2. The resistor 3 and the diodes 6 and 7 act as a limiting circuit and thus the base of transistor 4 cannot alter from a potential of zero volts by more than is permitted by the maximum forward volt drop across the diodes 6 and 7 irrespective of the value of the incoming signal. It will initially be assumed that the incoming signal is zero.

The arrangement of the transistor 4 is such that it is normally conducting, its base being substantially more positive than its emitter. As transistor 4 is conducting, there will be an inherent small potential drop between its base and emitter, the emitter being slightly negative with respect to the base. This potential drop between base and emitter is present in all transistors and has the effect so far as the switching of a transistor is concerned of delaying the switching operation until the applied base-emitter potential is sufficient to overcome it. The sense of the inherent potential drop depends on the conductivity type of the transistor.

When the incoming signal applied to the terminal 1 falls from zero to become very slightly negative, the emitter of transistor 4, already negative with respect to the zero volt line by reason of the inherent small potential drop in the transistor, will become slightly more negative by an amount which renders the emitter-base potential difference of transistor 8 sufficient to switch this transistor to the conducting state, the small inherent potential drop in transistor 4 being just sufficient to balance the inherent potential drop of opposite sense in transistor 8. When the incoming signal applied to the terminal 1 rises from zero to become slightly positive, the emitter of transistor 4, which, as explained, is slightly negative with respect to the base when the incoming signal is zero, will become slightly less negative and transistor 8 will be switched to the nonconducting state.

The arrangement of the two transistors 4 and 8 therefore enables transistor 8 to be switched from one state to the other by small excursions from zero of the incoming signal. By overcoming the inherent potential drop between the base and emitter of transistor 8, the circuit arrangement of the two transistors enables a square wave of mark-to-space ratio equivalent to that of the incoming alternating signal to be produced at the collector of transistor 8.

The square wave is passed to the base of the transistor 10. The Schmitt circuit serves simply to speed up the rise and fall of the square wave produced by transistor 8. The output from the Schmitt circuit is then passed to the base of transistor 19 for amplification, the output square wave of the circuit being produced at terminal 20.

In another embodiment of the invention, transistors 4 and 8 are both made from silicon instead of germanium. In such a case the diodes 6 and 7 are replaced by low voltage zener diodes: the latter diodes will have a higher volt drop across them at breakdown than the forward volt drop of diodes 6 and 7, this higher volt drop being necessary to switch the silicon transistor replacing transistor 8. The zener diodes would be connected in series opposition, that is with one pole of one diode directly connected to the same pole of the other diode.

What we claim as our invention and desire to secure by Letters Patent is:

1. A switching circuit comprising,
a voltage supply source,
a first and a second transistor connected to said source, said transistors being constructed from the same element germanium but of opposite conductivity type to one another, and each having emitter-base and collector-base junctions,
input means for receiving an alternating input signal and limiting the positive- and negative-going excursions thereof, said input means comprising
a resistor connected to the base of the first transistor and,
a pair of silicon diodes each having positive and negative poles and connected together in parallel with their opposite poles connected to one another, the pair of diodes being connected between the base of said first transistor and the emitter of said second transistor, and the alternating input signal being applied to the base of the first transistor through the said resistor,
first circuit means connecting the first transistor in an emitter-follower configuration and in such a relationship to the supply source as to manifest a predetermined voltage drop across the emitter-base junction of said first transistor,
second circuit means connecting the second transistor in a common emitter configuration and in such a relationship to the supply source as to manifest a voltage drop across the emitter-base junction of said second transistor equal to that possessed by the first transistor, the second transistor being connected to the first transistor whereby to switch between a conducting state and a non-conducting state and develop an output in response to the positive- and negative-going excursions of the limited input signal applied to the first transitsor, and
a trigger circuit connected to receive the output from the second transistor and operative to develop a square wave output signal in dependence on the said state assumed by the second transistor.

2. A switching circuit comprising,
a voltage supply source, a first and a second transistor connected to said source, said transistors being constructed from the same element silicon but of opposite conductivity type to one another, and each having emitter-base and collector-base junctions,
input means for receiving an alternating input signal and limiting the positive- and negative-going excursions thereof, said input means comprising
a resistor connected to the base of the first transistor and,
a pair of zener diodes connected in series opposition between the base of said first transistor and the emitter of said second transistor, and the alternating input signal being applied to the base of the first transistor through the said resistor,
first circuit means connecting the first transistor in an emitter-follower configuration and in such a relationship to the supply source as to manifest a predetermined voltage drop across the emitter-base junction of said first transistor,
second circuit means connecting the second transistor in a common emitter configuration and in such a relationship to the supply source as to manifest a voltage drop across the emitter-base junction of said second transistor equal to that possessed by the first transistor, the second transistor being connected to the first transistor whereby to switch between a conducting state and a non-conducting state and develop an output in response to the positive- and negative-going excursions of said limited input signal applied to the first transistor, and
a trigger circuit connected to receive the output from the second transistor and operative to develop a square wave output signal in dependence on the said state assumed by the second transistor.

References Cited

UNITED STATES PATENTS

| | | | |
|---|---|---|---|
| 2,890,352 | 6/1959 | Goodrich | 307—88.5 |
| 2,947,883 | 8/1960 | Welch | 307—88.5 |
| 3,051,905 | 8/1962 | Morris | 307—88.5 |
| 3,102,228 | 8/1963 | Werth | 307—88.5 |
| 3,163,829 | 12/1964 | Ladd | 307—88.5 |
| 3,165,636 | 1/1965 | Mellott | 307—88.5 |

OTHER REFERENCES

RCA Technical Notes No. 191, August 1958, "Two Stage DC Coupled Amplifier," by M. C. Kidd. (Copy in Group 250.)

ARTHUR GAUSS, *Primary Examiner.*

J. ZAZWORSKY, *Examiner.*